US005617623A

United States Patent [19]
Schron, Sr. et al.

[11] Patent Number: 5,617,623
[45] Date of Patent: Apr. 8, 1997

[54] INSTALLATION TOOL FOR KEYLOCKING INSERTS

[75] Inventors: Jack H. Schron, Sr., Chagrin Falls; Nicholas A. Ihnat, Twinsburg, both of Ohio

[73] Assignee: Jergens, Inc., Cleveland, Ohio

[21] Appl. No.: 448,791

[22] Filed: May 24, 1995

[51] Int. Cl.$^6$ ...................................................... B23Q 1/00
[52] U.S. Cl. ........................... 29/283.5; 29/240; 29/240.5
[58] Field of Search ................................... 81/10; 29/240, 29/240.5, 283.5, 456, 509, 520, 293, 517

[56] References Cited

U.S. PATENT DOCUMENTS

| | | | |
|---|---|---|---|
| 1,734,681 | 11/1929 | Lapham | 81/10 |
| 2,438,744 | 3/1948 | Flynn | 81/10 |
| 2,855,970 | 10/1958 | Neuschotz . | |
| 3,371,402 | 3/1968 | Nevschotz | 29/283.5 |
| 3,388,621 | 6/1968 | Nevschotz | 81/10 |
| 3,394,448 | 7/1968 | Nevschotz | 29/283.5 |
| 3,798,749 | 3/1974 | Duer | 81/10 |
| 4,669,141 | 6/1987 | Baglin . | |

Primary Examiner—Robert C. Watson
Attorney, Agent, or Firm—Pearne, Gordon, McCoy & Granger

[57] ABSTRACT

An apparatus for mounting and locking a keylocking insert in a threaded opening in a parent material includes a driver adapted for sequential mutual and relative rotation with the insert, drive means for rotationally driving the driver in response to a force applied thereto, and a press for operating the keys into a locking position. The driver has a threaded stud for threadably engaging interior threads of the insert to mount the insert in the parent material by threadably engaging the insert exterior thread with the threaded opening and advancing the external thread into the threaded opening in response to the mutual rotation of the driver. The press has a first end surface for engaging the keys of the insert and longitudinally moving toward the insert to operate the keys to the locking position in response to the relative rotation of the driver. The insert is thereby both mounted and locked by rotation of the driver.

19 Claims, 8 Drawing Sheets

5,617,623

INSTALLATION TOOL FOR KEYLOCKING INSERTS

BACKGROUND OF THE INVENTION

1. Field of the Invention

The present invention relates to an apparatus and method for mounting and locking an insert in a threaded opening, and more particularly, an apparatus and method that mounts and locks the insert with rotational movement.

2. Description of Related Art

Threaded inserts such as, for example tubular inserts or studs, are often used in threaded openings to repair damaged threads, to increase pullout strength, or to provide strong wear resistant threads in any type of parent material. The threaded opening preferably has a conical countersink so that the insert is positioned below the surface of the parent material when installed. The threaded inserts typically have means for positively locking against accidental removal from the opening. The lock means typically is one or more keys each positioned within and axially movable along a slot or groove formed in the outer surface of the threaded insert. An example of such a keylocking insert is disclosed in U.S. Pat. No. 2,855,970, the disclosure of which is expressly incorporated herein in its entirety.

The keys are formed to be driven axially along the grooves in the threaded insert, and to deform and axially shear or dig into the thread of the opening in which the insert is engaged. The deformation of the thread locks the insert in place. The keys typically have outwardly projecting portions for deforming the thread. The insert is installed by mounting the insert into the parent material by threading the insert into the threaded opening, and then locking the insert by impacting the keys. Typically a hammer or the like is used to impact a tool and axially drive the keys into the thread of the parent material.

Installation of the insert in this manner has several shortcomings. The separate steps of rotating the insert and impacting the keys slows installation and makes automated assembly difficult. The impact on the tool can leave a set mark on the countersink of the parent material. The depth of the keys varies depending on the amount of driving force. The depth of the insert below the surface of the parent material varies with the depth of the countersink of the threaded opening. Hand manipulation of the insert can result in a relatively high risk of injury for the installer. The keys are subject to rollover which leads to faulty installation such as, for example, insertion below a recommended or predetermined depth below the surface of the parent material. Accordingly there is a need in the art for an improved apparatus and method for mounting and locking inserts.

SUMMARY OF THE INVENTION

The present invention provides an apparatus and method for mounting and locking an insert in a threaded opening in a parent material that solves the above-noted shortcomings of the related art. The apparatus according to the invention includes a driver, drive means for rotationally driving the driver in response to a force applied thereto, and a press. The driver has at least a portion adapted for sequential mutual and relative rotation with the insert. The driver also includes means for engaging the insert to mount the insert in the parent material by threadably engaging the insert exterior thread with the threaded opening and advancing the external thread into the threaded opening in response to the mutual rotation of the driver. The press has a surface adapted for engaging the lock means of the insert and is adapted for longitudinally moving toward the insert to operate the lock means from the first position to the second position in response to the relative rotation of the driver.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
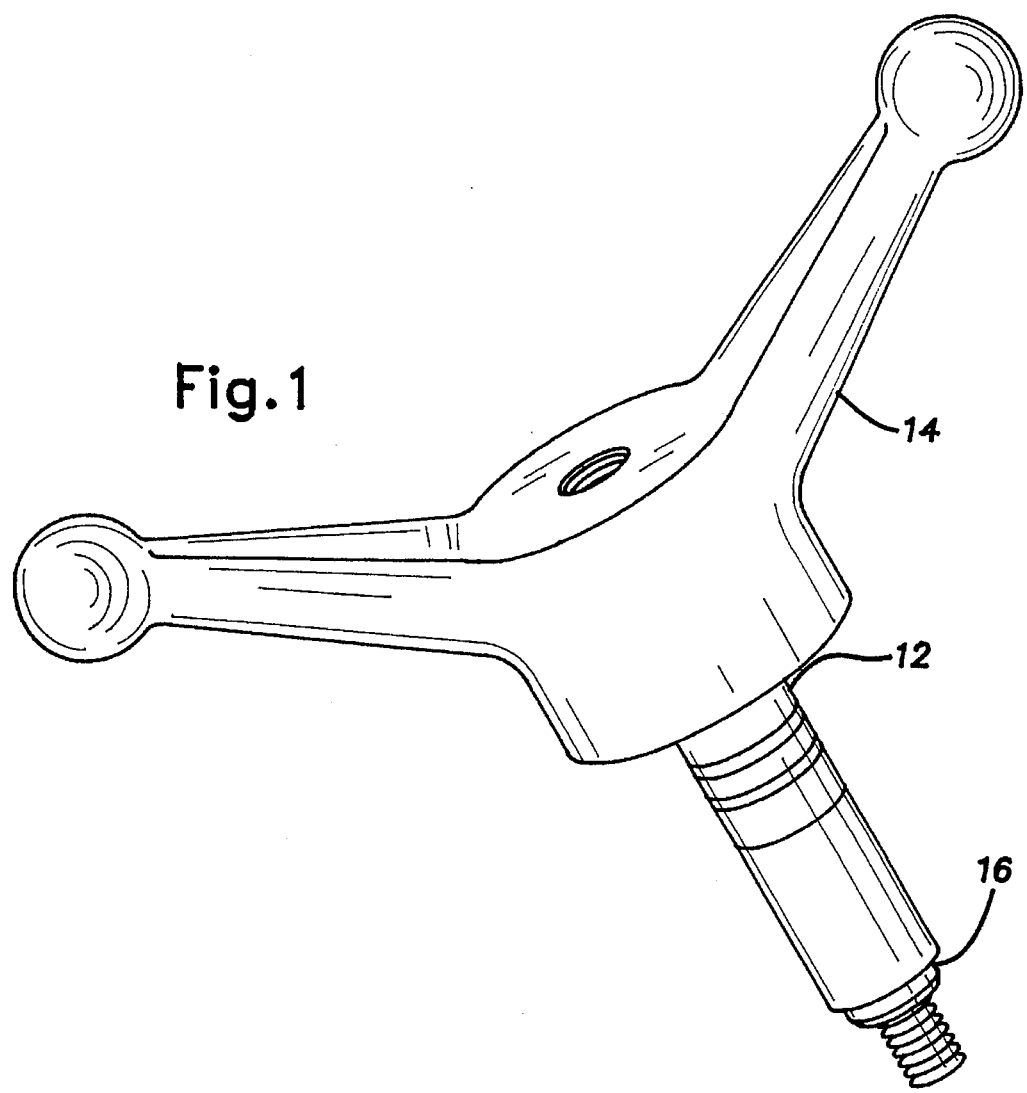
FIG. 1 is a perspective view of a first embodiment of an installation tool according to the invention.

FIG. 1 shows a first embodiment of an apparatus or installation tool according to the present invention for installing keylocking inserts. The installation tool includes a driver 12, drive means 14 for driving the driver 12, and a press 16.

Figure 2:
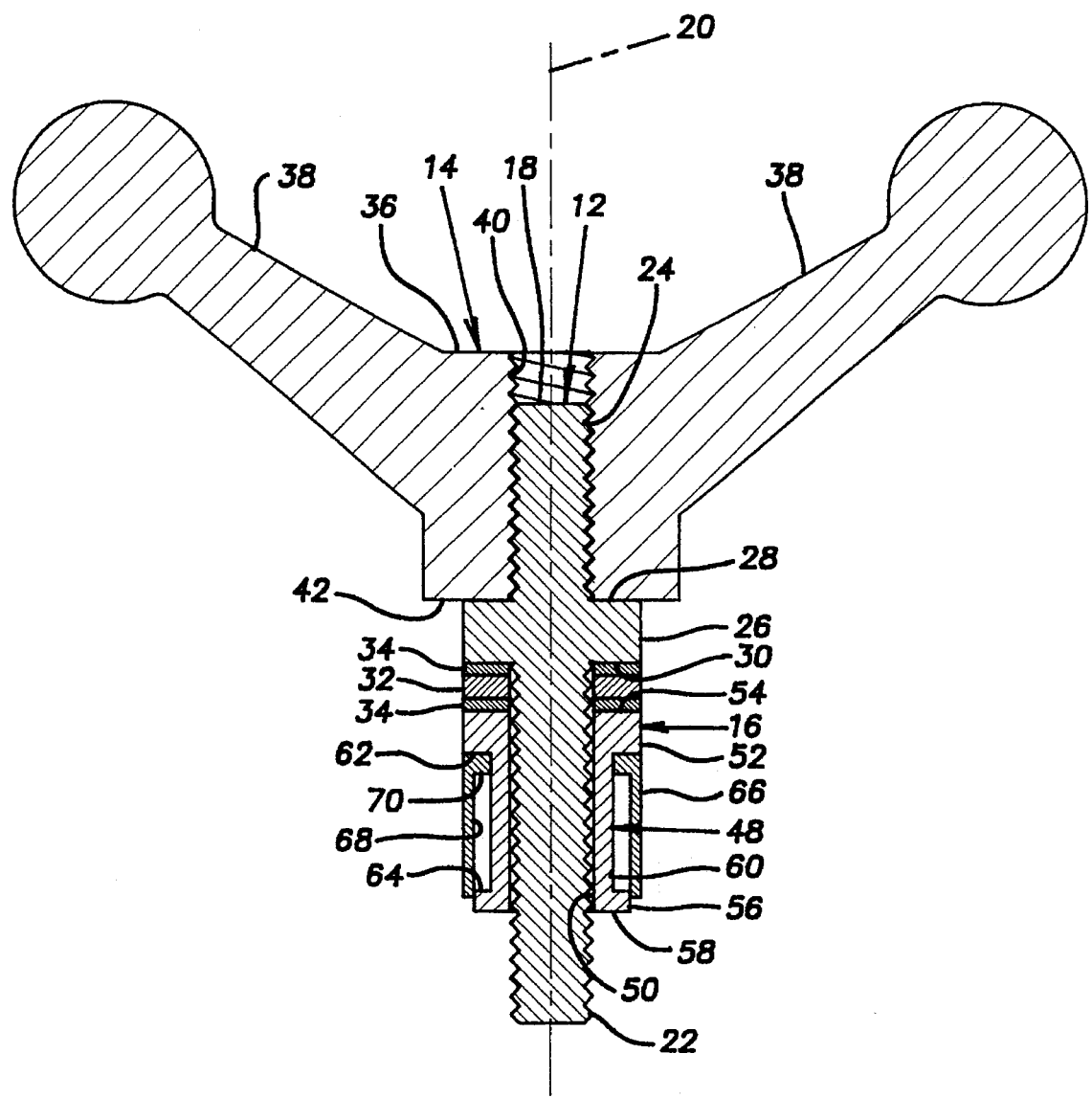
FIG. 2 is a cross-sectional view of the installation tool of FIG. 1.

As best seen in FIG. 2, the driver 12 includes an element or stud 18 having a longitudinal axis which forms an axis of rotation 20 for the installation tool. The stud 18 has a threaded proximal end 22 complementary to and for engaging internal threads of an insert to be installed and a threaded distal end 24 for threadably engaging the drive means 14. Between the proximal and distal ends 22, 24 is a shoulder section 26 forming first and second shoulder surfaces 28, 30, each generally perpendicular to the longitudinal axis of the stud 18.

Means for allowing relative rotational movement between the driver 12 and the press 16 during operation of the lock means of the insert is also provided. That is, means for preventing rotational movement of the press 16 during operation of the lock means of the insert in response to rotational movement of the driver 12. The means for allowing relative rotational movement preferably includes a thrust bearing 32. The bearing 32 is sized to surround a portion of the proximal end 22 of the stud 18 and is positioned to engage the second shoulder surface 30. Preferably, a washer 34 is provided on each side of the bearing 32 to provide a hardened and smooth bearing surface for the rotating elements of the bearing 32.

The drive means 14 includes a body 36 and two handles 38 extending upwardly and outwardly from the body 36. The body 36 has a threaded central bore 40 complementary to and sized for engagement with the threaded distal end 24 of the stud 18 and an engagement surface 42 generally perpendicular to the axis of the central bore 40. The body 36 is rotated or threaded onto the stud 18 such that the engagement surface 42 contacts the first shoulder surface 28 of the stud 18 and prevents further rotational movement of the body 36 relative to the stud 18. The handles 38 are generally equally spaced about the axis of the threaded central bore 40 to rotationally drive or rotate the stud 18 on the axis of rotation 20 when a force is applied thereto.

Figure 3A:
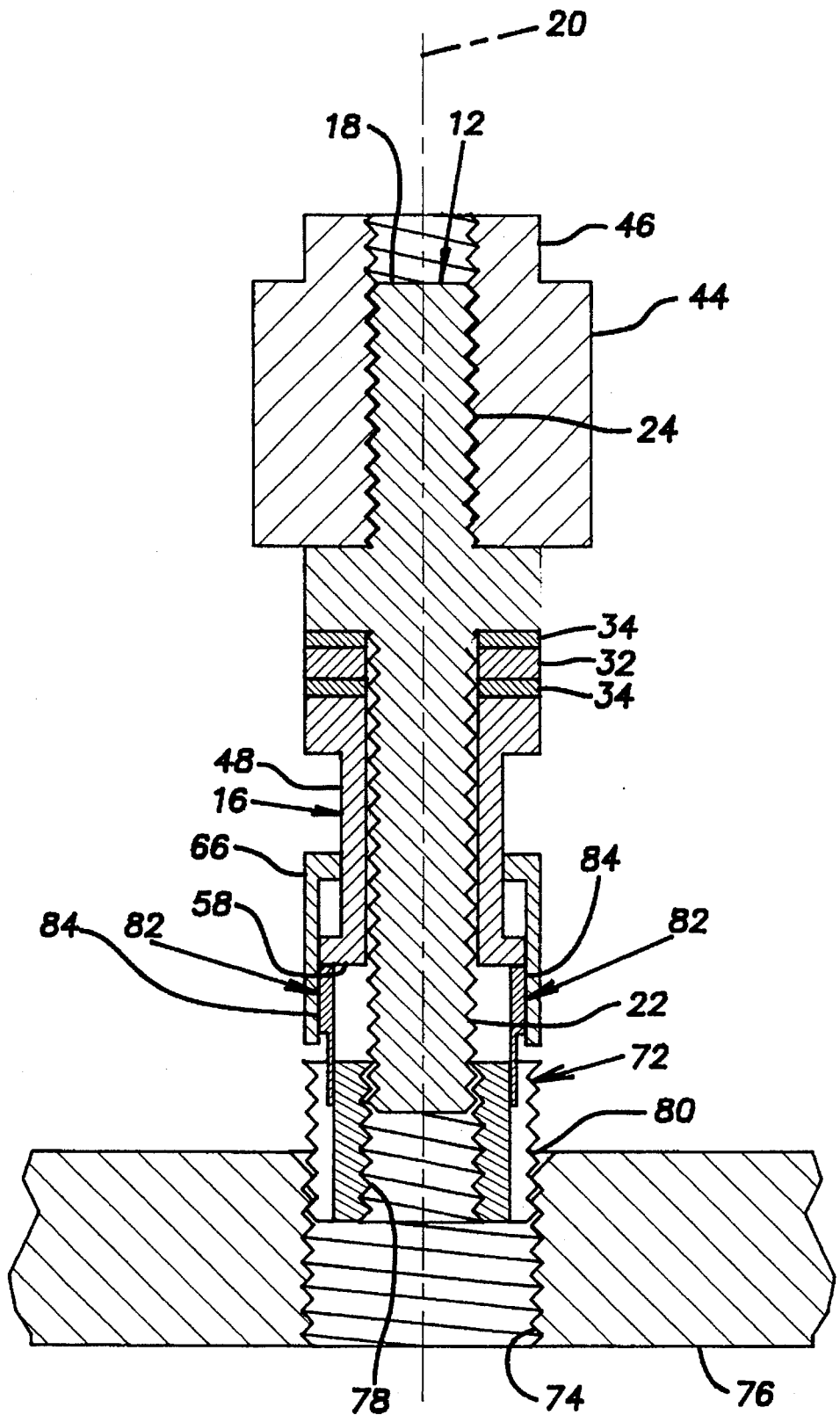
FIGS. 3A and 3B are elevational views, in cross-section, of a variation of the installation tool of FIG. 1 installing a keylocking insert.

It will be noted that the drive means 14 could include other configurations for rotatably driving the driver 12 such as, for example, the drive means 44 shown in FIG. 3A. The drive means 44 includes a wrenching surface 46, preferably hexagonally-shaped, that is generally concentric with the axis of rotation 20 such that a socket of a power tool can rotate the stud 18 on the axis of rotation 20. The wrenching surface is typically a ¼ inch hex head.

As seen in FIG. 2, the press 16 includes a longitudinally extending bushing or press member 48 having a central bore 50 sized for surrounding a portion of the proximal end 22 of the stud 18. The press member 48 also has a first end section 56 having a diameter generally equal to a diameter formed by the locking means of the insert to be installed (best seen in FIG. 3A) and forming a first end surface 58 generally perpendicular to the axis of the central bore 50. The press member 48 has a second end section 52 having a diameter generally equal to the diameter of the thrust bearing 32 and the shoulder section 26 of the stud 18 and forming a second end surface 54 which is generally perpendicular to the axis of the central bore 50. A central section 60 of the press member 48 has a reduced outer diameter relative to the first and second end sections 52, 56 of the press member 48 which forms first and second engagement surfaces 62, 64. The press member 48 is positioned on the proximal end 22 of the stud 18 such that the second end surface 54 of the press member 48 engages the washer 36 of the thrust bearing 34. In this position the proximal end 22 of the stud 18 extends from the first end surface 58 of the press member 48 a distance such that it can threadably engage the internal treads of the insert to be installed when the lock means of the insert is engaged with the second end surface 58 of the press member 48 (as seen in FIG. 3A).

The press 16 also includes a sleeve 66 having an outer diameter generally equal to the diameter of the second end section 52 of the press member 48 and a central bore 68 sized to receive the first end section 56 of the press member 48. An end of the sleeve 66 toward the second end section 54 of the press member 48 has a radially inwardly extending projection 70 sized for surrounding the central section 60 of the press member 48 so that the sleeve 66 can longitudinally move relative to the press member 48. The longitudinal movement of the sleeve 66 is limited by engagement of the projection 70 with the first and second engagement surfaces 62, 64. The length of the sleeve 66 is sized such that the sleeve is slightly larger than the length of the central section 60 of the press member 48. Additionally, the length of the sleeve 66 is generally sized such that the proximal end 22 of the stud 18 is completely surrounded when the projection 70 engages the second engagement surface 64.

Figure 3B:
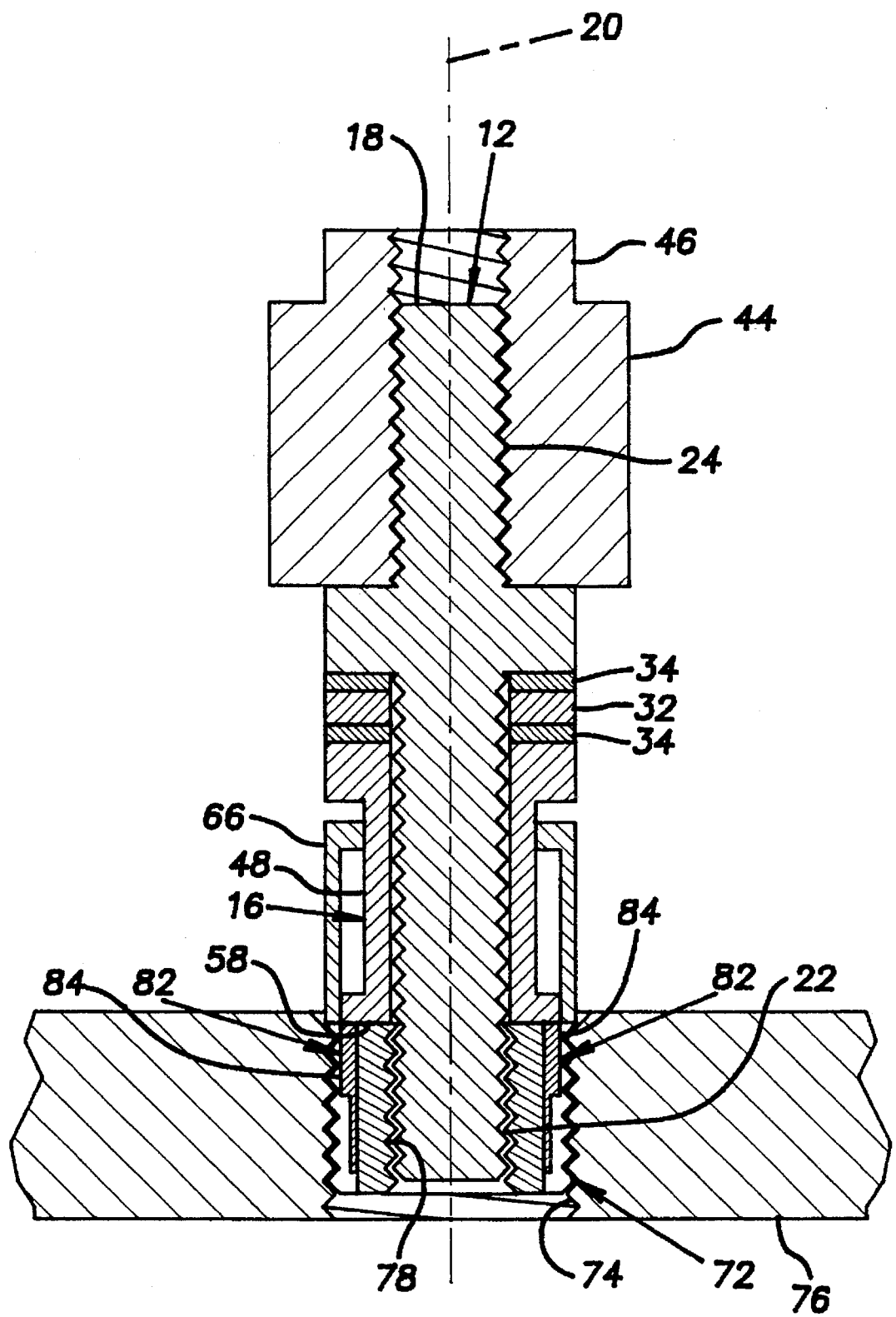

FIGS. 3A and 3B illustrate the installation tool installing an insert 72 into a threaded opening 74 having a conical countersink in a sheet of parent material 76. As seen in FIG. 3A, the insert 72 has a bore with an internal thread 78, an exterior thread 80 complementary to and for engagement with the threaded opening 74, and lock means, such as keys 82, operable from a first position (seen in FIG. 3A) allowing rotation of the insert 72 into the threaded opening 74 and a second position (seen in FIG. 3B) locking the insert 72 against rotation in the threaded opening 74. First, the proximal end 22 of the stud 18 is engaged with the internal thread 78 of the insert 72 until the keys 82 engage the first end surface 58 of the press member 48. Next the sleeve 66 is longitudinally moved toward the insert 72 at least a distance to surround the keys 82.

A socket of a power tool is placed over the wrenching surface 46 of the drive means 44 so that a force can be selectively applied to rotationally move the drive means 44 on the rotational axis 20. The rotational movement of the drive means 44 drives the stud 18, the press member 48, and the insert 72 in mutual rotation on the rotational axis 20 such that the external thread 80 of the insert 72 is threaded into the threaded opening 74 of the parent material 76. The mutual rotation is obtained because the torque required to advance the keys 82 is greater than the torque required to threadably engage the insert 72 into the parent material 76. Rotation of the insert 72 is stopped when projections 84 of the keys 82 engage the parent material 76 indicating correct longitudinal positioning of the insert 72 in the threaded opening 74. Continued rotation of the drive means 44 rotates the stud 18, on the rotational axis 20, relative to the press member 48 and the insert 72. The relative rotation is obtained because the torque required to advance the keys 82 is less than the torque required to further threadably engage the insert 72 into the parent material 76. Therefore, the continued rotation of the drive means 44 threads the proximal end 22 of the stud 18 further into the internal thread 78 of the insert 72.

As seen in FIG. 3B, the movement of the stud 18 into the insert 72 longitudinally moves the press member 48 toward the insert 72 to operate or advance the keys 82 from the first position to the second position. That is, the press member 48 is longitudinally moved toward the insert 72 in response to rotational movement of the drive means 44. The keys 82 deform the threaded opening 74 of the parent material 76 to lock the insert 72 against rotation in the parent material 76. The thrust bearing 32 enables the stud 18 to rotate relative to the press member 48 to minimize rotational loads on the keys 82 as they are moved. Otherwise, the rotational loads may cause the keys 82 to roll over, that is, twist or bend.

The sleeve 66 provides support to the keys 82 to minimize outward bending of the keys 82 as they are moved. It is noted that the press member 48 moves within the sleeve 66, which has engaged the parent material 76, as the press member 48 moves toward the insert 72. Longitudinal movement of the press member 48 is halted when the second end surface 58 of the press member contacts the insert 72. Finally, a reverse force is applied to the drive means 44 so that the proximal end 22 of the stud 18 is threadably withdrawn from the internal thread 78 of the insert 72.

Figure 4:
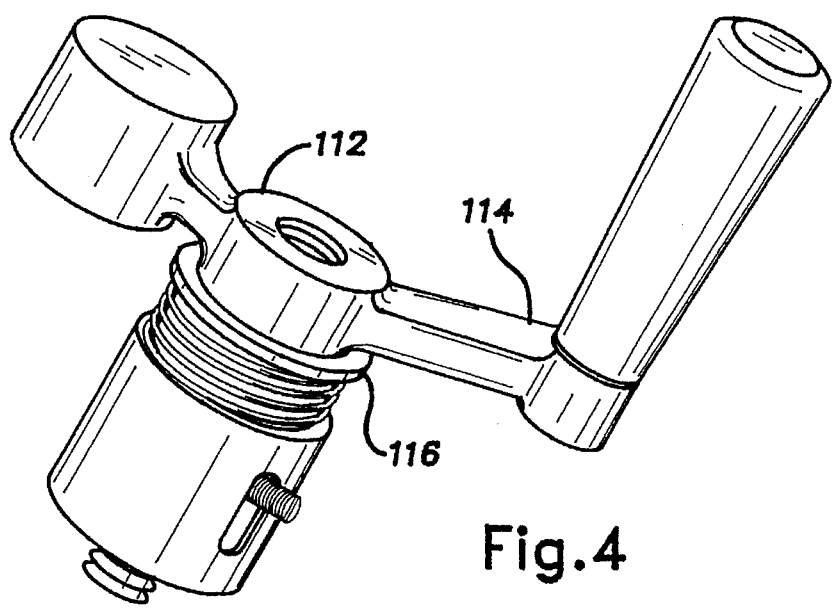
FIG. 4 is perspective view of a second embodiment of an installation tool according to the invention.

FIG. 4 shows a second embodiment of an apparatus or installation tool according to the present invention for installing keylocking inserts. The installation tool includes a driver 112, drive means 114 for driving the driver 12, and a press 116.

Figure 5:
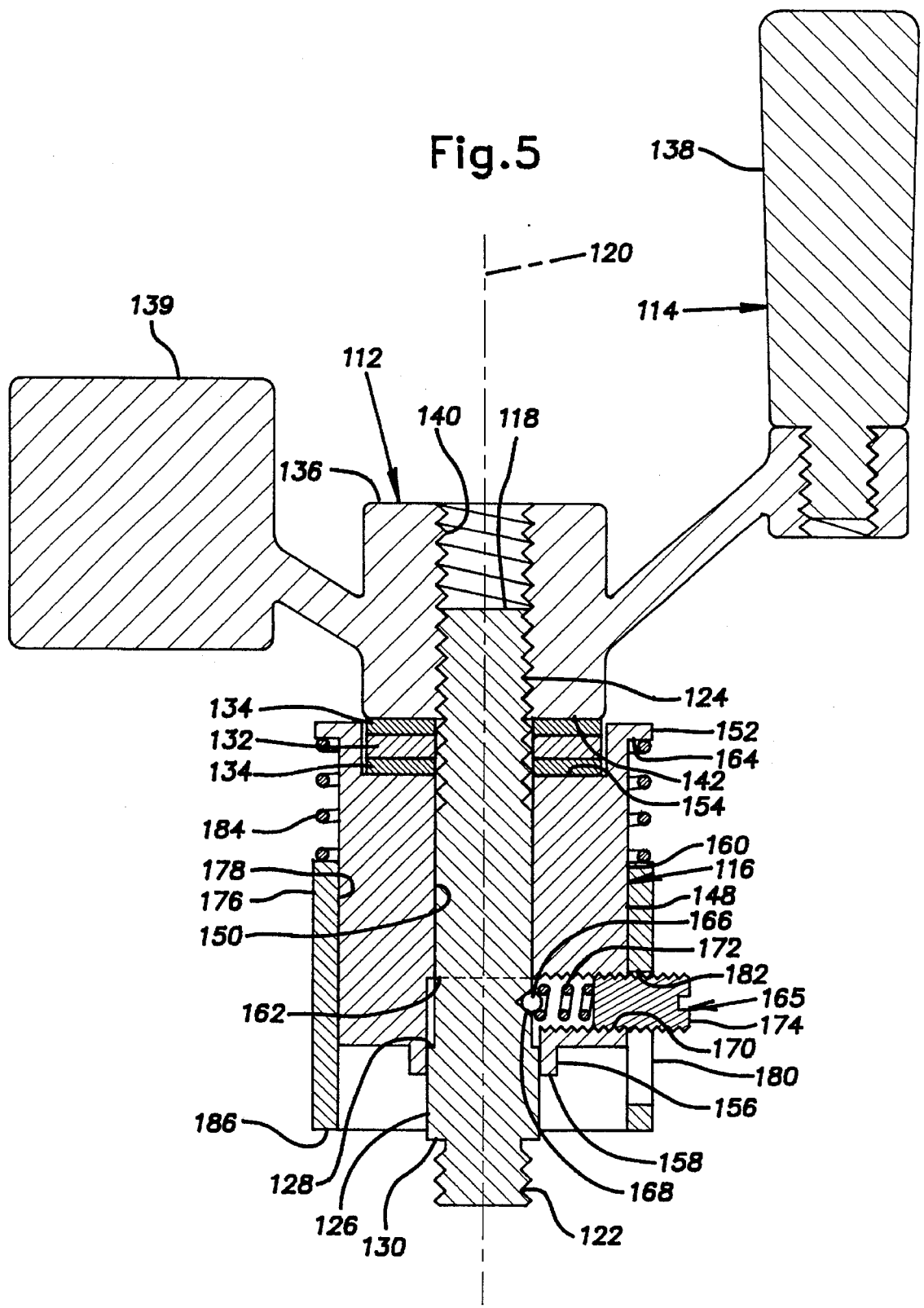
FIG. 5 is a cross-sectional view of the installation tool of FIG. 4.

As best seen in FIG. 5, the driver 112 includes an element or stud 118 having a longitudinal axis which forms an axis of rotation 120 for the installation tool. The stud 118 has a threaded proximal end 122 complementary to and for engaging internal threads of an insert to be installed and a threaded distal end 124 for threadably engaging the drive means 114. Between the proximal and distal ends 122, 124 is a shoulder section 126 forming first and second shoulder surfaces 128, 130, each generally perpendicular to the longitudinal axis of the stud 118. The diameter of the shoulder section 126 is generally equal to a an inner diameter formed by the keys of the insert (best seen in FIG. 6A). The length of the shoulder section is generally equal to the distance from the top of the insert to the top of the keys.

Means for allowing relative rotational movement between the driver 112 and the press 116 during operation of the lock means of the insert is provided. That is, means for preventing rotational movement of the press 116 during operation of the lock means of the insert in response to rotational movement of the driver 112. The means for allowing relative rotational movement preferably includes a thrust bearing 132. The bearing 132 is sized to surround a portion of the distal end 24 of the stud 118. Preferably, a washer 134 is provided on each side of the bearing 132 to provide a hardened and smooth bearing surface for the rotating elements of the bearing 132.

The driver 112 also includes a press member driver 136 having a threaded central bore 140 complementary to and sized for engagement with the threaded distal end 124 of the stud 118 and an engagement surface 142 generally perpendicular to the axis of the central bore 140.

The drive means 114 includes a handle 138 and a counter weight 139 extending outwardly from the press member driver 136. The handle 138 and the counterweight 139 are generally equally spaced about the axis of the threaded central bore 140 of the press member driver 136 to rotationally drive or rotate the press member driver 136 on the axis of rotation 120 when a force is applied to the handle 138.

Figure 6A:
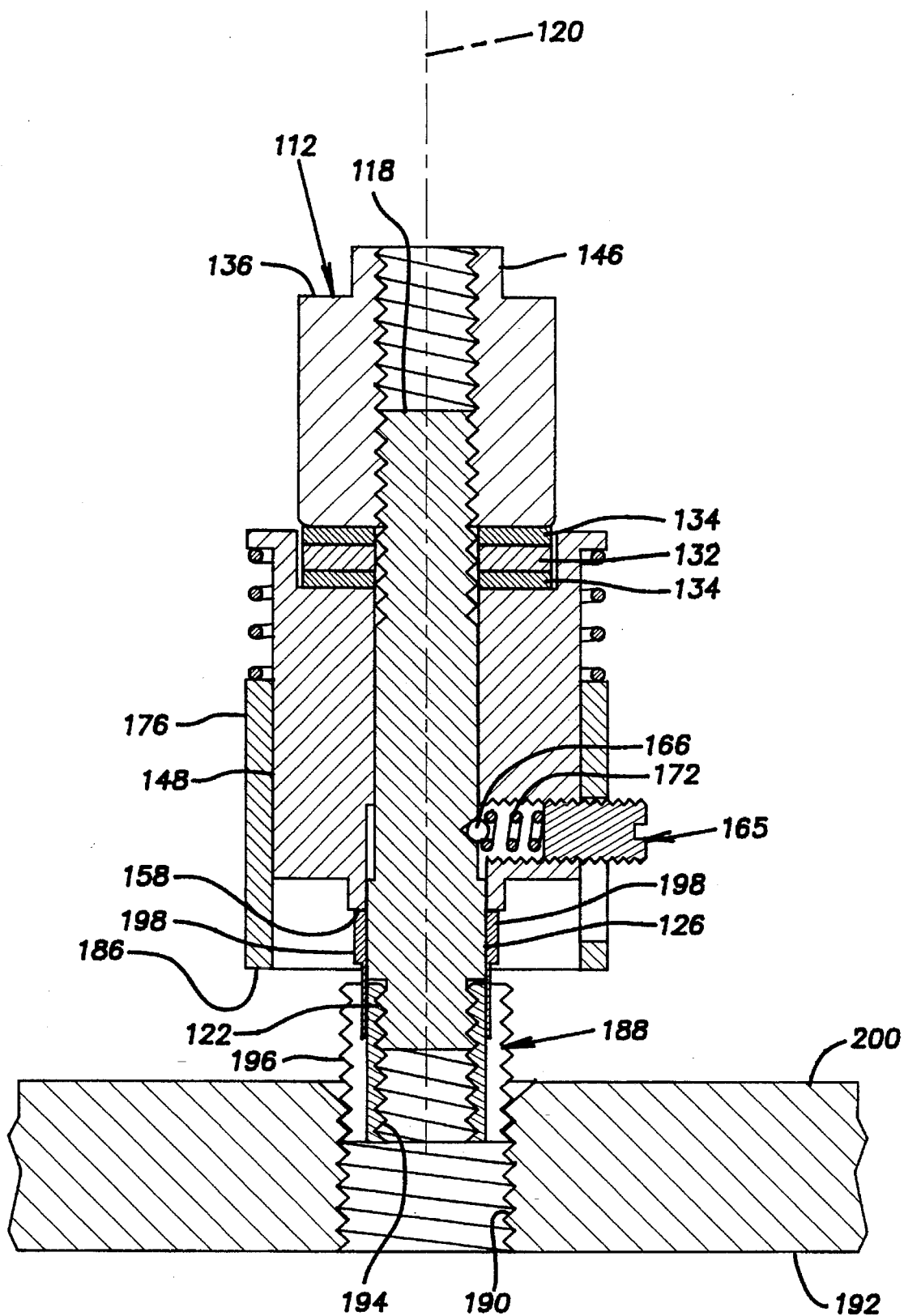
FIGS. 6A, 6B, and 6C are elevational views, in cross section, of a variation of the installation tool of FIG. 4 installing a keylocking insert.

It will be noted that the drive means 114 could include other configurations for rotatably driving the press member driver 136 such as, for example, the drive means shown in FIG. 6A. The drive means includes a wrenching surface 146 on the press member driver 136, preferably hexagonally shaped, that is generally concentric with the axis of rotation 120 such that a socket of a power tool can rotate the press driver member 136 on the axis of rotation 120. The wrenching surface is typically a ¼ inch hex head.

The press 116 includes a longitudinally extending bushing or press member 148 having a central bore 150 sized for surrounding a portion of the distal end 124 of the stud 118. The press member 148 also has a first end section 156 having an outer diameter generally equal to a diameter formed by the locking means of the insert to be installed (best seen in FIG. 6A) and forming a first end surface 158 generally perpendicular to the axis of the central bore 150. The first end section 156 has a length effective for allowing the lock means to be operated below the surface of the parent material. The first end surface 158 has a recess or counterbore forming an engagement surface 162. The counterbore has a diameter sized for receiving the shoulder section 126 of the stud 118 and a length that equals at least the distance from the top of the insert to the top of the keys. The press member 148 has a second end section 152 having a recess or counterbore forming a second end surface 154 which is generally perpendicular to the axis of the central bore 150. The counterbore is sized for receiving the thrust bearing 132 and washers 134. A central section 160 of the press member 148 has an outer diameter smaller than the outer diameter of the second end section 152 to form a retaining surface 164 and larger than the outer diameter of the first end section 156. The press member 148 is positioned on the distal end 124 of the stud 118 such that the first end surface 154 of the press member 48 engages the washer 134 cooperating with the thrust bearing 132.

Means for allowing mutual rotation of the stud 118, the press member driver 136, the press member 148, and the insert during engagement of the insert with the threaded opening is also provided. The means for allowing mutual rotation preferably includes detent 165. The detent 165 includes a ball 166 and a generally V-shaped notch 168 located in the distal end 124 of the stud 118. Ball 166 is located in a threaded opening 170 in the central section 160 of the press member 148 which is generally perpendicular to and opens into the central bore 150 of the press member 148. The ball 166 is biased into the notch 168 by a helical coil compression spring 172 located between the ball 166 and a retaining 174 screw threadably engaged with and extending outwardly from an outer portion of the threaded opening 170. It will be noted that other detents or other means for biasing the ball 166 could be utilized.

A sleeve or depth gage 176 is also provided having an outer diameter generally equal to the diameter of the first end section 152 of the press member 148 and a central bore 178 sized to receive the central section 160 of the press member 148. A longitudinally elongated opening 180 is provided in the depth gage 176 to form an upper engagement surface 182. The elongated opening 182 is sized to receive an outer end of the retaining screw 174. A helical coil compression spring 184 is located between an end of the depth gage 176 toward the distal end 124 of the stud 118 and the retaining surface 164 of the press member 148. The spring 184 biases the depth gage 176 toward the proximal end 122 of the stud 118 so that the upper engagement surface 182 contacts the retaining screw 174. The depth gage 176 is dimensioned such that a bottom edge or lower engagement surface 186 is located above the second shoulder surface 130 a predetermined distance that the insert is to be longitudinally located below the surface of the parent material. This distance is preferably about 0.010 inches.

Figure 6B:
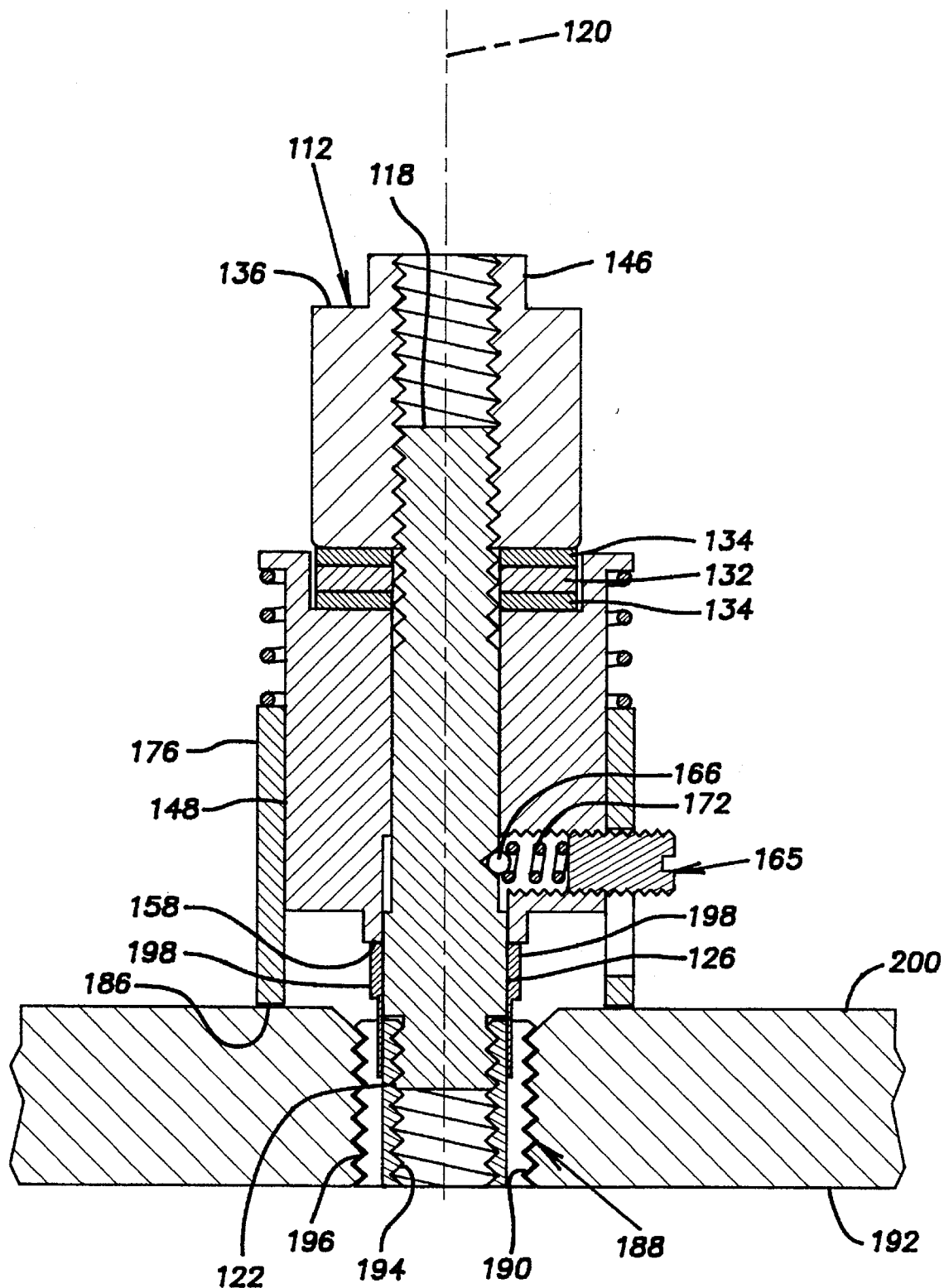
Figure 6C:
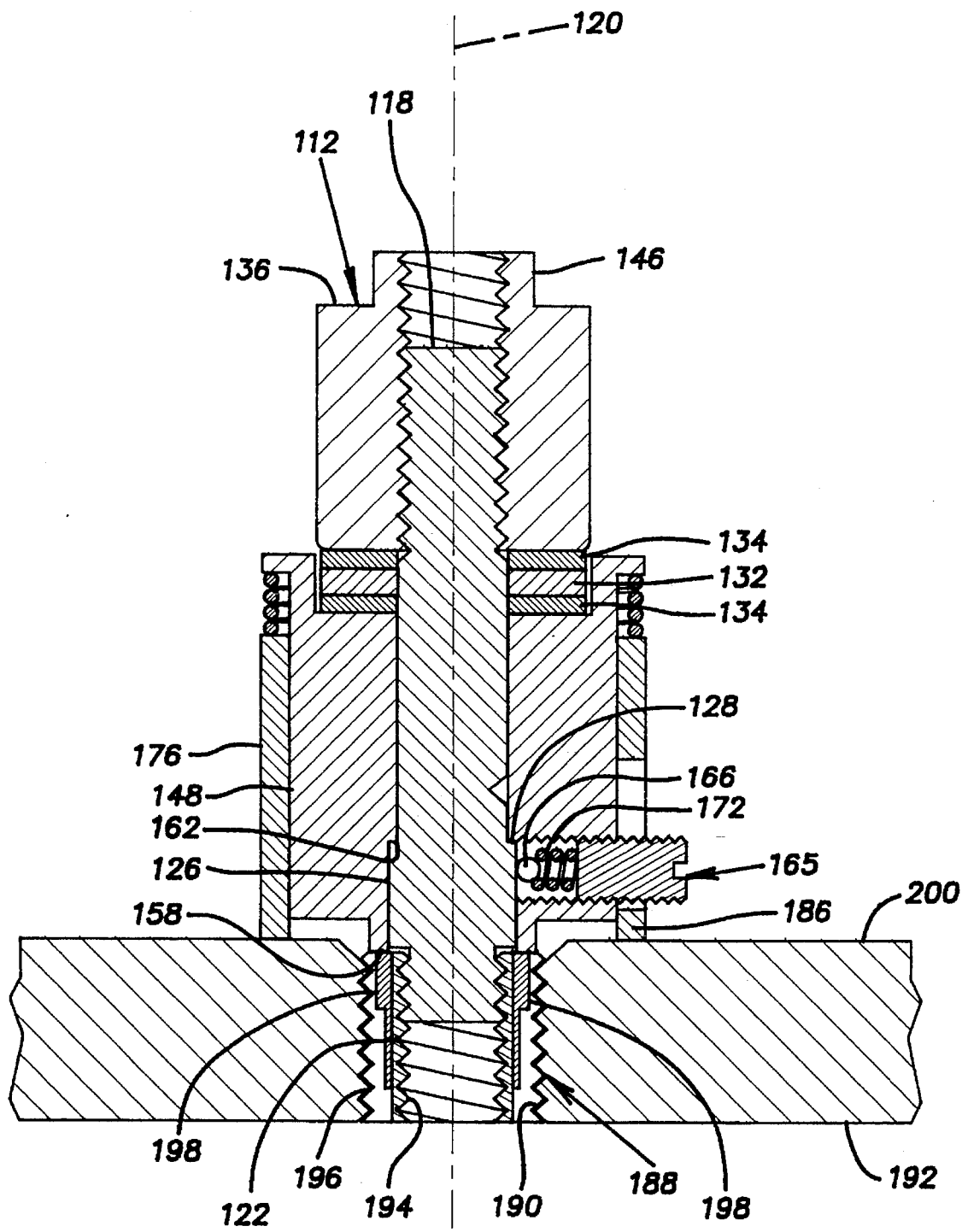

FIGS. 6A, 6B, and 6C illustrate the installation tool installing an insert 188 into a threaded opening 190 having a conical counterbore in a sheet of parent material 192. As best seen in FIG. 6A, the insert 188 has a bore with an internal thread 194, an exterior thread 196 complementary to and for engagement with the threaded opening 190, and lock means, such as keys 198, operable from a first position (seen in FIG. 6A) allowing rotation of the insert 192 into the threaded opening 190 and a second position (seen in FIG. 6C) locking the insert 188 against rotation in the threaded opening 190. First, the proximal end 122 of the stud 118 is engaged with the internal thread 194 of the insert 188 until the keys 198 engage the first end surface 158 of the press member 148.

A socket of a power tool is placed over the wrenching surface 146 so that a force can be selectively applied to rotationally move the press member driver 136 on the rotational axis 120. The rotational movement of the press drive member 136 drives the stud 118, the press member 148, and the insert 188 in mutual rotation on the rotational axis 120 such that the external thread 196 of the insert 188 is threaded into the threaded opening 190 of the parent material 192. The mutual rotation is obtained because the torque required to overcome the detent 165 is greater than the torque required to threadably engage the insert 188 into the parent material 192.

As seen in FIG. 6B, rotation of the insert 188 is stopped when the lower engagement surface 186 of the depth gage 176 contacts a surface 200 of the parent material 192 surrounding the threaded opening 190. The depth gage 176, therefore, insures that the insert 188 is longitudinally located at a predetermined depth below the surface 200 of the parent material 192. Rotation of the insert 188 is stopped because the torque required to rotate the press member 148 is greater than the torque required to overcome the detent 165 due to friction between the lower engagement surface 186 of the depth gage 176 and the surface 200 of the parent material 192. Therefore, the detent 165 is overcome by outwardly deflecting the ball 166 and compressing the spring 172. Continued rotation of the press drive member 136 on the rotational axis 120 is relative to the stud 118, the press member 148, and the insert 188. The relative rotation is obtained because the torque required to rotate the press member driver 136 and move the press member 148 to advance the keys 198 is now less than the torque required to further threadably engage the insert 188 into the parent material 192.

As seen in FIG. 6C, the continued rotation of the press member driver 136 longitudinally moves the press member 148 toward the insert 188 to operate or advance the keys 198 from the first position to the second position. That is, the press member 148 is longitudinally moved toward the insert 188 in response to rotational movement of the press member driver 136. The keys 198 deform the threaded opening 190 of the parent material 192 to lock the insert 188 against rotation in the parent material 192. The thrust bearing 132 enables the press drive member 136 to freely rotate relative to the press member 148 to minimize rotational loads on the keys 198 as they are moved. Otherwise, the rotational loads may cause the keys 198 to roll over, that is, twist or bend.

The shoulder section 126 of the stud 118 provides support to the keys 198 to minimize inward bending of the keys 198 as they are moved. It is noted that the press member 148 moves within the depth gage 176, which has engaged the parent material 192, as the press member 148 moves toward the insert 188 and the spring is compressed. Longitudinal movement of the press member 148 is halted when the engagement surface 162 of the press member 148 contacts the first shoulder surface 128 of the stud 118. Proper dimensioning of the press member 148 and the stud 118, therefore insures that the keys 198 are set flush with the top of the insert 188. Finally, a reverse force is applied to the press member driver 136 to threadably withdraw the proximal end 122 of the stud 118 from the internal thread 194 of the insert 188. Because the insert is mounted and the keys are set solely by rotational motion, the installation tool is particularly desirable for automated assembly.

Although particular embodiments of the invention have been described in detail, it will be understood that the invention is not limited correspondingly in scope, but includes all changes and modifications coming within the spirit and terms of the claims appended hereto.

What is claimed is:

1. An apparatus for mounting and locking an insert in a threaded opening in a parent material, said insert having an exterior thread complementary to and for engagement with said threaded opening and lock means operable from a first position allowing rotation of the insert into the threaded opening and a second position locking the insert against rotation in the threaded opening, said apparatus comprising:

a driver having a central axis, at least a portion adapted for sequential mutual and relative rotation with the insert, and engagement means for engaging the insert to mount the insert in the parent material by threadably engaging the insert exterior thread with the threaded opening and advancing the external thread into the threaded opening in response to said mutual rotation of said driver;

drive means for rotationally driving at least a portion of said driver in response to a force applied thereto; and a press adapted to operate the lock means from the first position to the second position in response to said relative rotation of said driver, said press including a generally tubularly-shaped press member surrounding at least a portion of said driver and rotatable relative to said driver about said central axis of said driver, said press member having a first end surface for engaging the lock means of the insert.

2. The apparatus of claim 1, wherein said driver comprises an element adapted to longitudinally extend from a proximal end adjacent said insert to a distal end adjacent said drive means, said element being adapted to threadably engage said insert adjacent its proximal end and to engage said drive means adjacent its distal end.

3. The apparatus of claim 2, wherein said press member concentrically surrounds a portion of said element.

4. The apparatus of claim 3, further comprising means for allowing relative rotational movement between the driver and the press member during operation of the lock means from the first position to the second position.

5. The apparatus of claim 3, wherein said element has a shoulder section between said proximal end and said distal end forming a shoulder surface and said press member forms a second end surface at an end toward said shoulder surface, said shoulder surface cooperating with said second end surface for longitudinally moving said press member toward the insert to operate the lock means from the first position to the second position in response to said relative rotation.

6. The apparatus of claim 5, further comprising a thrust bearing between said shoulder surface and said second end surface to allow relative rotational movement of the driver with said press member during operation of the lock means from the first position to the second position.

7. The apparatus of claim 3, said press further comprising a generally tubularly-shaped sleeve having an inner diameter sized for surrounding the lock means of the insert and adapted for longitudinal movement from a first location surrounding at least a portion of said press member to a second location surrounding at least a portion of the lock means of the insert to support the lock means during operation of the lock means from the first position to the second position.

8. The apparatus of claim 3, wherein said drive means includes a press member driver threadably engaging said distal end of said element and a detent for allowing said mutual rotation.

9. The apparatus of claim 8, wherein said detent includes a notch in said element, a ball, a spring member within a threaded opening in said press member biasing said ball into said notch, and a retaining screw threadably engaging said threaded opening and supporting said spring member.

10. The apparatus of claim 8, wherein said press member driver forms an engagement surface and said press member forms a second end surface at an end toward said engagement surface, said engagement surface cooperating with said second end surface for longitudinally moving said press member toward the insert to operate the lock means from the first position to the second position in response to said relative rotation.

11. The apparatus of claim 10, further comprising a thrust bearing between said engagement surface and said second end surface to allow relative rotational movement of the press member driver with said press member during operation of the lock means from the first position to the second position.

12. The apparatus of claim 10, wherein said parent material has a surface surrounding the threaded opening and further comprising a depth gage operable between said press member and the surface to limit the longitudinal movement of the insert to a predetermined depth below the surface of the parent material.

13. The apparatus of claim 12, wherein said depth gage is adapted for increasing torque required to rotate said press member to release said detent and commence said relative rotation.

14. The apparatus of claim 13, wherein said depth gage includes a tubularly-shaped member sized for surrounding at least a portion of said press member and a spring member biasing said tubularly-shaped member toward the surface of the parent material.

15. The apparatus of claim 14, wherein said tubularly shaped member has an elongated opening, and said detent includes a notch in said element, a ball, a spring member within a threaded opening in said press member biasing said ball into said notch, and a retaining screw threadably engaging and extending from said threaded opening and supporting said spring member, said retaining screw extending into said elongated opening to substantially prevent rotation of said tubularly shaped member relative to said press member and to limit longitudinal movement of said depth gage.

16. The apparatus of claim 1, wherein said press member has a section forming said first end surface with an outer diameter sized for allowing operation of the lock means below a surface of the parent material surrounding the threaded opening.

17. The apparatus of claim 3, wherein said element has a shoulder section adjacent said proximal end with a diameter sized to support the lock means during operation of the lock means from the first position to the second position.

18. The apparatus of claim 17, wherein said shoulder section forms a shoulder surface and said press member forms an engagement surface at an end toward said shoulder surface, said shoulder surface cooperating with said second end surface for limiting the longitudinal movement of said press member toward the insert.

19. An apparatus for mounting and locking an insert in a threaded opening in a parent material, said insert having an exterior thread complementary to and for engagement with said threaded opening, and internal thread, and lock means operable from a first position allowing rotation of the insert into the threaded opening and a second position locking the insert against rotation in the threaded opening, said apparatus comprising:

a driver adapted for mounting the insert in the parent material by threadably engaging the insert exterior thread with the threaded opening and advancing the external thread into the threaded opening in response to mutual rotation of said driver and the insert, said driver including a stud having a central axis and an externally threaded proximal end sized for cooperating with the insert internal thread;

drive means for rotationally driving at least a portion of said driver in response to a force applied thereto; and a press adapted for operating the lock means from the first position to the second position in response to rotation of at least a portion of said driver relative to the insert, said press including a generally tubularly-shaped press member surrounding at least a portion of said stud and rotatable relative to said stud about said central axis of said stud, said press member having a first end surface for engaging the lock means of the insert.

* * * * *